United States Patent
Komatsu et al.

(10) Patent No.: US 12,151,401 B2
(45) Date of Patent: Nov. 26, 2024

(54) EDGE ALIGNMENT METHOD

(71) Applicant: DISCO CORPORATION, Tokyo (JP)

(72) Inventors: Atsushi Komatsu, Tokyo (JP); Koichi Makino, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 813 days.

(21) Appl. No.: 17/194,482

(22) Filed: Mar. 8, 2021

(65) Prior Publication Data

US 2021/0291404 A1 Sep. 23, 2021

(30) Foreign Application Priority Data

Mar. 18, 2020 (JP) .................................. 2020-047195

(51) Int. Cl.
*G05B 19/402* (2006.01)
*B28D 5/00* (2006.01)
(Continued)

(52) U.S. Cl.
CPC ......... *B28D 5/0064* (2013.01); *B28D 5/0082* (2013.01); *B28D 5/029* (2013.01);
(Continued)

(58) Field of Classification Search
CPC .... B28D 5/0064; B28D 5/0082; B28D 5/029; B28D 5/024; G05B 19/402; G06T 7/73;
(Continued)

(56) References Cited

U.S. PATENT DOCUMENTS 5,825,913 A * 10/1998 Rostami ................... G06T 7/73
348/87
5,982,491 A * 11/1999 Breyer ................. G01B 11/005
356/613
(Continued)

FOREIGN PATENT DOCUMENTS

JP 2000173961 A 6/2000

OTHER PUBLICATIONS

Matlab isoutlier, Feb. 22, 2018, retrieved from—https://web.archive.org/web/20180222013301/https://www.mathworks.com/help/matlab/ref/isoutlier.html, 10 pages (Year: 2018).*
(Continued)

*Primary Examiner* — Yongjia Pan
(74) *Attorney, Agent, or Firm* — GREER BURNS & CRAIN, LTD.

(57) ABSTRACT

An edge alignment method includes (a) calculating coordinates of points having a possibility of corresponding to an edge of the workpiece, (b) forming an approximate circle by using a least squares method on all the coordinates, (c) calculating deviations between the approximate circle and respective ones of all the points, and if plural ones of the points have deviations greater than or equal to a preset threshold, respectively, then determining the point, the deviation of which is greatest, to be a false detection position, and excluding from consideration candidates the point determined to be the false detection position, and (d) estimating a position of the edge of the workpiece from the (Continued)

coordinates of three or more of the points still remaining without exclusion, and based on the estimated position of the edge, deriving a machining area at the outer peripheral portion of the workpiece.

3 Claims, 6 Drawing Sheets

(51) Int. Cl.
    *B28D 5/02*     (2006.01)
    *G06T 7/73*     (2017.01)
    *G05D 3/20*     (2006.01)

(52) U.S. Cl.
CPC .............. *G05B 19/402* (2013.01); *G06T 7/73* (2017.01); *G05D 3/20* (2013.01); *G06T 2207/30164* (2013.01)

(58) Field of Classification Search
CPC ... G06T 2207/30164; G06T 7/64; G06T 7/12; G06T 7/0004; G06T 7/001; G06T 7/13; G06T 7/60; G06T 7/62; G05D 3/20; H01L 21/67265; H01L 21/681; B24B 9/065; B24B 41/068; B24B 49/12; G06V 10/44; G06V 10/255; G06V 2201/06; G06V 2201/07
See application file for complete search history.

(56) References Cited

U.S. PATENT DOCUMENTS

| | | | | |
|---|---|---|---|---|
| 6,126,380 | A * | 10/2000 | Hillman | H01L 21/681 414/754 |
| 8,098,412 | B2 * | 1/2012 | Kagami | H01L 21/681 358/448 |
| 8,731,274 | B2 * | 5/2014 | Langmans | G06T 7/0004 382/145 |
| 2007/0183666 | A1 * | 8/2007 | Ding | G06V 10/44 382/199 |
| 2013/0144568 | A1 * | 6/2013 | Palma-Amestoy | G01B 11/24 703/1 |
| 2015/0017879 | A1 * | 1/2015 | Chang | G06T 7/0004 451/5 |
| 2015/0153729 | A1 * | 6/2015 | Kurahashi | G05B 19/41875 700/110 |
| 2015/0370175 | A1 * | 12/2015 | Nicolaides | G03F 7/7085 355/77 |
| 2016/0078612 | A1 * | 3/2016 | Kodama | H01L 21/681 382/151 |
| 2017/0294300 | A1 * | 10/2017 | Kozai | H01L 21/67259 |
| 2018/0068895 | A1 * | 3/2018 | Sandoh | H01L 21/3065 |
| 2019/0143553 | A1 * | 5/2019 | Matsuno | B23Q 11/0032 225/93 |
| 2019/0378759 | A1 * | 12/2019 | Sugiya | H01L 21/78 |

OTHER PUBLICATIONS

Jiawei Yang, Susanto Rahardja, Pasi Fränti, Outlier Detection: How to Threshold Outlier Scores, Dec. 19-21, 2019, retrieved from—https://www.cs.joensuu.fi/sipu/pub/a37-yang.pdf, 6 pages (Year: 2019).*

* cited by examiner

EDGE ALIGNMENT METHOD

BACKGROUND OF THE INVENTION

Field of the Invention

The present invention relates to an edge alignment method for deriving a machining area, to which machining is to be applied, on an outer peripheral portion of a disc-shaped workpiece.

Description of the Related Art

On a disc-shaped workpiece such as a semiconductor wafer, a beveled portion may be formed with a corner portion of an outer peripheral portion on a side of a front surface and a corner portion of an outer peripheral portion on the side of a back surface being both chamfered. When a workpiece with the beveled portion formed thereon is ground on the side of the back surface to, for example, a half or less of its original thickness, a sharp area (a generally-called sharp edge) is formed on the outer peripheral portion on the side of the back surface. The sharp edge is prone to formation of microcracks, chippings, and the like. Moreover, cracks may run using as starting points the microcracks or the like formed in the sharp edge, leading to a potential problem of breakage of the workpiece. For the prevention of formation of such a sharp edge, there is hence known an edge trimming technique that before performing grinding on the side of the back surface, trims the peripheral portion beforehand on the side of the front surface over only a predetermined thickness to remove the beveled portion on the side of the front surface (see, for example, Japanese Patent Laid-Open No. 2000-173961).

When performing edge trimming, a cutting machine is usually employed. The cutting machine has a chuck table to hold a workpiece under suction. Above the chuck table, a cutting unit is arranged. The cutting unit includes a cylindrical spindle arranged in substantially parallel to an upper surface of the chuck table, and a cutting blade mounted on an end portion of the spindle. Further, the cutting unit is provided with a camera to image the workpiece held under suction on the chuck table. When performing edge trimming, an edge alignment is first performed. In the edge alignment, the workpiece is held under suction on the side of a back surface thereof by the chuck table, and the workpiece is imaged by the camera at a plurality of locations on an outer peripheral portion on the side of a front surface thereof. At each location, one point on an edge is specified in terms of coordinates, and the position of the edge of the workpiece is estimated from the coordinates of plural points. An annular area from the edge to a predetermined extent on a center side of the front surface is then trimmed by cutting.

To perform the edge trimming with high accuracy, it is necessary to estimate the position of the edge of the workpiece with high accuracy in the edge alignment. However, the estimation accuracy of the position of the edge decreases for various factors. If there is, for example, a contaminant particle adhered on a beveled portion, a water droplet or contaminant particle adhered on a holding surface of the chuck table, a contaminant particle adhered on a lens of the camera, or the like, the position of such a contaminant particle or water droplet may be misidentified as a point on the edge.

SUMMARY OF THE INVENTION

If a position of contaminant particle or water droplet is misidentified to be one point on an edge of a workpiece, then the position of the edge of the workpiece cannot be appropriately estimated, consequently leading to a substantial deviation in an area to which cutting is to be applied. With the foregoing problem in view, the present invention has as an object thereof to enable an estimation of the position of an edge of a workpiece with high accuracy even if the position of a contaminant particle or water droplet is misidentified as one point on the edge.

In accordance with an aspect of the present invention, there is provided an edge alignment method for a disc-shaped workpiece. The edge alignment method includes a holding step of holding the workpiece on a chuck table, a coordinate calculation step of calculating coordinates of one point having a possibility of corresponding to an edge of the workpiece at each of a plurality of different locations in a peripheral direction of the workpiece on an outer peripheral portion of the workpiece, an approximate circle forming step of forming an approximate circle by using a least squares method on all the coordinates calculated in the coordinate calculation step, a false detection position excluding step of calculating deviations between the approximate circle formed in the approximate circle forming step and respective ones of all the points, and in a case where plural ones of the points have deviations greater than or equal to a preset threshold, respectively, determining the point, the deviation of which is greatest, to be a false detection position, and excluding from consideration candidates the point determined to be the false detection position, and a machining area deriving step of after the false detection position excluding step, estimating a position of the edge of the workpiece from the coordinates of three or more of the points still remaining without exclusion, and based on the estimated position of the edge, deriving a machining area at the outer peripheral portion of the workpiece.

Preferably, the edge alignment method may further include an additional approximate circle forming step of after the exclusion of the point the deviation of which is the greatest in the false detection position excluding step, forming an approximate circle again by using the least squares method on the coordinates of all the points still remaining without exclusion from the consideration candidates in the false position excluding step.

Preferably, the edge alignment method may further includes an additional false detection position excluding step of calculating deviations between the approximate circle formed in the additional approximate circle forming step and the respective ones of all the points still remaining without exclusion from the consideration candidates in the false detection position excluding step, and if plural ones of the points have deviations greater than or equal to the preset threshold, respectively, determining the point, the deviation of which is greatest, to be a false detection position, and excluding from consideration candidates the point determined to be the false detection position. In a case where no point is determined to have a deviation greater than or equal to the preset threshold after calculating the deviations between the approximate circle formed in the additional approximate circle forming step and the respective ones of all the points remaining without exclusion from the consideration candidates in the false detection position excluding step, the machining area deriving step is performed again.

In the edge alignment method according to the aspect of the present invention, the approximate circle is formed (in the approximate circle forming step) using the least square method on all the coordinates calculated in the coordinate calculation step. Further, deviations are calculated between the approximate circle formed in the approximate circle forming step and respective ones of all the points, and if plural ones of the points have deviations greater than or equal to the preset threshold, respectively, the point the deviation of which is greatest is determined to be a false detection position, and the point determined to be the false detection position is excluded from consideration candidates (false detection position excluding step). The position of the edge of the workpiece is then estimated from the coordinates of three or more of the points still remaining without exclusion, and based on the estimated position of the edge, the machining area at the outer peripheral portion of the workpiece is derived (machining area deriving step). By excluding the point, which has been determined to be the false detection position, out of the plural points as described above, the position of the edge of the workpiece can be estimated with higher accuracy. The machining area can hence be derived accurately.

The above and other objects, features and advantages of the present invention and the manner of realizing them will become more apparent, and the invention itself will best be understood from a study of the following description and appended claims with reference to the attached drawings depicting, presenting or illustrating a preferred embodiment of the invention.

DETAILED DESCRIPTION OF THE PREFERRED EMBODIMENT

Figure 1:
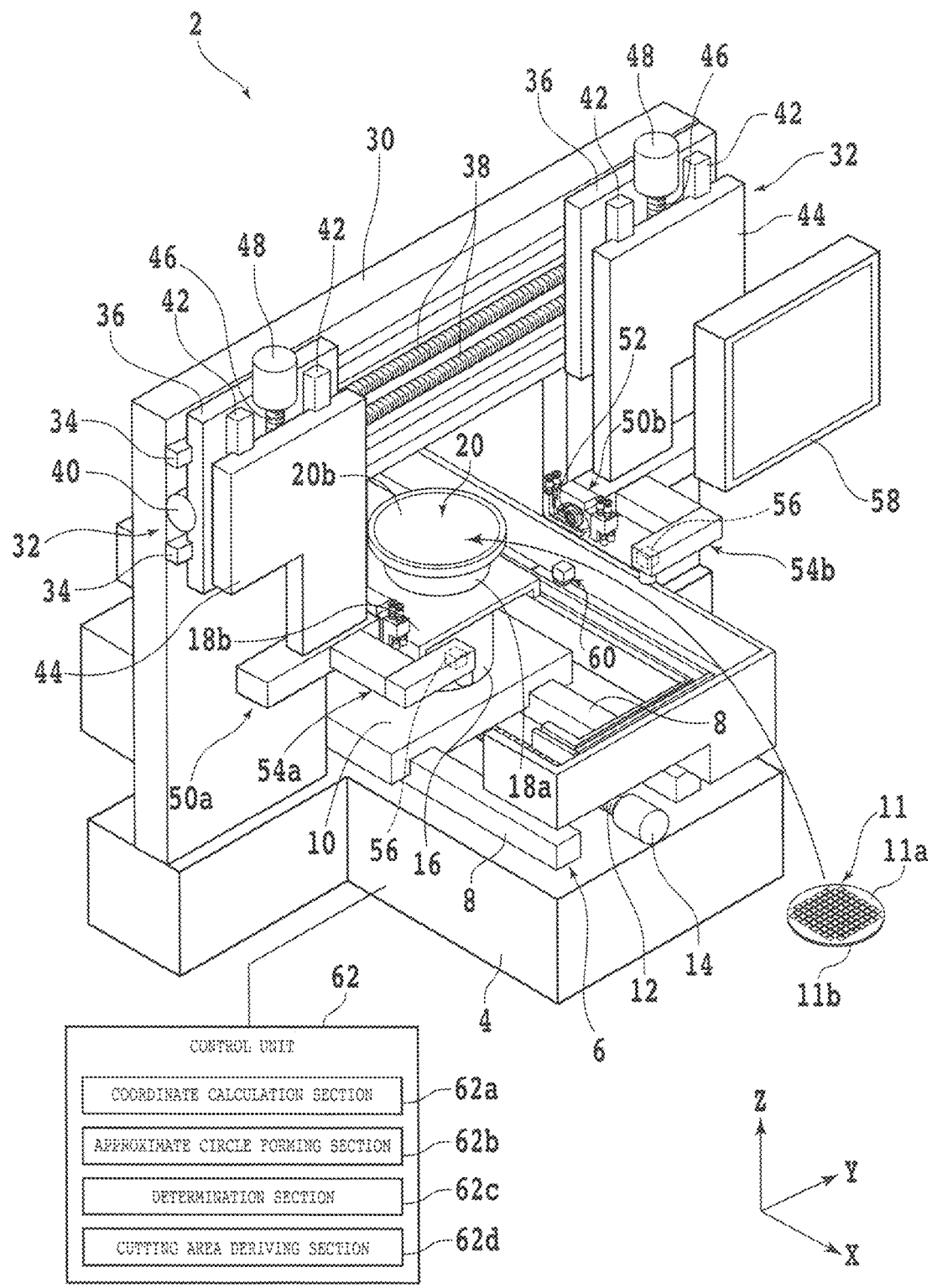
FIG. 1 is a perspective view of a cutting machine.

With reference to the attached drawings, a description will be made about an embodiment of the present invention. FIG. 1 is a perspective view of a cutting machine 2. An X-axis direction (processing feed direction, front-rear direction), a Y-axis direction (indexing feed direction) and a Z-axis direction (vertical direction, height direction), all, indicated in FIG. 1 intersect one another at right angles. In FIG. 1, some of elements are illustrated as function blocks. The cutting machine 2 includes a bed 4 on which the individual elements are mounted. On an upper surface of the bed 4, an X-axis moving mechanism 6 is disposed. The X-axis moving mechanism 6 has a pair of X-axis guide rails 8, which are substantially parallel with the X-axis direction.

An X-axis moving table 10 is slidably mounted on the X-axis guide rails 8. Nut portions (unillustrated) are disposed on the side of a lower surface (back surface) of the X-axis moving table 10, and an X-axis ball screw 12 which is substantially parallel with the X-axis guide rails 8 is connected in a rotatable fashion to the nut portions. An X-axis pulse motor 14 is connected to an end portion of the X-axis ball screw 12. Rotation of the X-axis ball screw 12 by the X-axis pulse motor 14 causes the X-axis moving table 10 to move in the X-axis direction along the X-axis guide rails 8.

A cylindrical θ table 16 is disposed on the side of an upper surface (on the side of a front surface) of the X-axis moving table 10. The θ table 16 has a rotary drive source (unillustrated) such as a motor. A disc-shaped table base 18a or the like is disposed on the θ table 16. A table cover 18b is disposed around the table base 18a, and on one side and an opposite side in the X-axis direction of this table cover 18b, bellows-shaped expandable dust/splash covers (unillustrated) are arranged, respectively. The table cover 18b and dust/splash covers cover over the X-axis moving mechanism 6.

A disc-shaped chuck table 20 is disposed on an upper surface of the table base 18a. The chuck table 20 is connected at a lower portion thereof to the θ table 16 via the table base 18a, so that the chuck table 20 is rotatable about a rotating shaft 20a (see FIG. 2A) which is substantially parallel with the Z-axis direction. The chuck table 20 has a disc-shaped frame formed of a metal such as stainless steel. A recess is formed on the side of an upper surface of the frame, and a disc-shaped porous plate, which is formed of porous ceramics and has an outer diameter substantially equal to an inner diameter of the recess, is fixed in the recess.

The porous plate is connected to a suction source (unillustrated) such as a vacuum pump or a vacuum ejector via a flow passage formed in the frame. When the suction source is operated, a negative pressure occurs on the upper surface (holding surface 20b) of the porous plate. By the negative pressure, a workpiece 11 is held under suction on the holding surface 20b. The workpiece 11 is, for example, a disc-shaped wafer formed of a semiconductor such as silicon, and on the side of its front surface 11a, has a device area and an outer peripheral margin area surrounding the device area. The device area is divided into a plurality of regions by streets arranged in a lattice pattern, and devices such as integrated circuits (ICs) or large scale integrations (LSIs) are formed in the respective regions.

On the upper surface of the bed 4, a gantry support structure 30 is arranged astride the X-axis moving mechanism 6. A cutting unit moving mechanism 32 is arranged on a front surface of the support structure 30. The cutting unit moving mechanism 32 is provided with a pair of Y-axis guide rails 34 disposed on the front surface of the support structure 30. Each Y-axis guide rail 34 is arranged substantially in parallel with the Y-axis direction. On the paired Y-axis guide rails 34, two Y-axis moving plates 36 are mounted slidably in the Y-axis direction. A nut portion (unillustrated) is disposed on the side of a back surface of each Y-axis moving plate 36.

Different Y-axis ball screws 38 are connected in a rotatable fashion to the respective nut portions. Each Y-axis ball screw 38 is disposed substantially in parallel with the corresponding Y-axis guide rails 34, and on an end portion of each Y-axis ball screw 38, a Y-axis pulse motor 40 is connected. Rotation of the Y-axis ball screw 38 by the Y-axis pulse motor 40 causes the corresponding Y-axis moving plate 36 to move in the Y-axis direction along the Y-axis guide rails 34. A cut-in unit is disposed on a front surface of each Y-axis moving plate 36.

Each cut-in unit has a pair of Z-axis guide rails 42 disposed on the front surface of the corresponding Y-axis moving plate 36. Each Z-axis guide rail 42 is arranged substantially in parallel with the Z-axis direction. A Z-axis moving plate 44 is slidably mounted on each pair of the Z-axis guide rails 42. On the side of a back surface of the Z-axis moving plate 44, a nut portion (unillustrated) is disposed, and a Z-axis ball screw 46, which is parallel to the corresponding Z-axis guide rails 42, is connected in a rotatable fashion to the nut portion. A Z-axis pulse motor 48 is connected to an end portion of the Z-axis ball screw 46.

Rotation of the Z-axis ball screw 46 by the Z-axis pulse motor 48 causes the Z-axis moving plate 44 to move in the Z-axis direction along the Z-axis guide rails 42. A cutting unit 50a is fixedly secured on a lower portion of the Z-axis moving plate 44 located on one side in the Y-axis direction. On the other hand, another cutting unit 50b is fixedly secured on a lower portion of the Z-axis moving plate 44 located on an opposite side in the Y-axis direction. The cutting units 50a and 50b each have a prismatic spindle housing, a length direction of which extends substantially in parallel with the Y-axis direction.

Inside each spindle housing, a cylindrical spindle (unillustrated) is accommodated with a length direction thereof extending substantially in parallel with the Y-axis direction. The spindle is supported in a rotatable fashion by the spindle housing. The spindle is provided with a rotary drive source such as a motor. An end portion of the spindle projects outwardly of the spindle housing, and a cutting blade 52 having a ring-shaped cutting edge is mounted on the end portion.

A camera unit 54a is arranged on a front-side side surface of the spindle housing of the cutting unit 50a. In addition, another camera unit 54b is also arranged similarly on a front-side side wall of the spindle housing of the cutting unit 50b. The camera units 54a and 54b each capture a visible light image of an object such as the workpiece 11 held on the holding surface 20b. The camera units 54a and 54b each include a light source such as a light emitting diode (LED), an objective lens (unillustrated), and an imaging device 56 such as a charge coupled device (CCD) image sensor or a complementary metal oxide semiconductor (CMOS) image sensor. Upon performing an edge alignment, the camera units 54a and 54b image, for example, the outer peripheral portions on the side of the front surface 11a of the workpiece 11 at a plurality of locations in its circumferential direction.

The plural images of the workpiece 11 captured by the camera units 54a and 54b are individually presented on the display 58. The display 58 is arranged on a front side of the cutting machine 2. The display 58 is, for example, a touch panel that functions as both an input device for inputting instructions from an operator to the cutting machine 2 and a display device for presenting images.

Below the respective cutting units 50a and 50b, blade position detecting units 60 are disposed to detect the positions (heights) of lower extremities of the corresponding cutting blades 52. Each blade position detecting unit 60 has a hard, electrically conductive member (unillustrated) or the like formed of a metal plate or the like. The electrically conductive member has, for example, a rectangular cuboid shape. The position of an upper surface of the electrically conductive member in its height direction has been set in advance. When the rotating cutting blade 52 comes into contact at the lower extremity thereof with the upper surface of the electrically conductive member, a closed circuit is formed by the cutting blade 52, the electrically conductive member and the like, whereby the position of the lower extremity of the cutting blade 52 is specified.

The cutting machine 2 is provided with a control unit 62, which controls operations of the X-axis moving mechanism 6, the θ table 16, the cutting unit moving mechanisms 32, the cutting units 50a and 50b, the camera units 54a and 54b, the blade position detecting units 60, and the like. The control unit 62 is configured from a computer that includes, for example, a processing device such as a processor represented by a central processing unit (CPU), a main storage device such as a dynamic random access memory (DRAM), a static random access memory (SRAM), or a read only memory (ROM), and an auxiliary storage device such as a flash memory, a hard disc drive, or a solid-state drive.

Software including predetermined programs is stored in the auxiliary storage device. Functions of the control unit 62 are realized by operating the processing device and the main storage device in accordance with the software. The control unit 62 includes a coordinate calculation section 62a, which is configured to calculate the coordinates of one point corresponding to an edge 11c (see FIG. 2B) of the workpiece 11 in the image of each location on the outer peripheral portion of the workpiece 11 as captured by the camera unit 54a or 54b. The coordinate calculation section 62a is configured from a program, and performs binarization processing of, for example, images (see FIGS. 3A and 3B), each of which has a substantially square display area and is composed of multiple gradations (256 levels ranging from 0 to 255 pixel values), by using a predetermined pixel value (for example, 125) as a threshold.

Regarding the point of intersection of a boundary in an image formed by the binarization processing and a predetermined diagonal of the substantially square image as a point (one point) 64 corresponding to the edge 11c (see FIG. 4A and so on), the coordinate calculation section 62a also calculates the coordinates of the point 64. It is to be noted that the coordinates of the point 64 are calculated using the rotating shaft 20a as an origin. The control unit 62 further includes an approximate circle forming section 62b configured to form an approximate circle 21 (see FIG. 4A) by using the least squares method on the coordinates of the plural points 64. The approximate circle forming section 62b is configured from a program.

A brief description will be made of an algorism that forms the approximate circle 21 by using the least squares method. The respective coordinates of n points 64 are assumed to be $(X_i, Y_i)$, the center of the approximate circle calculated by the least squares method is assumed to be (a, b), and the radius of the circle is assumed to be r. Here, n is a natural number of 2 or greater, and i is a natural number of 1 or greater and n or smaller. After transforming $\Sigma\{(X_i-a)^2+(Y_i-b)^2-r^2\}^2=0$ into $\Sigma\{X_i^2+Y_i^2+AX_i+BY_i+C\}^2=0$, whose partial derivative is then taken with respect to A, B, and C, respectively. It is to be noted that $\Sigma$ means a sum with respect to i. As a consequence, three equations are obtained for A, B, and C, respectively, and solutions for A, B, and C are obtained by solving the three equations. As $A=-2a$, $B=-2b$ and $C=a^2+b^2-r^2$ in the above-described equation transformation, the center coordinates (a, b) and the radius r, which form the approximate circle 21, are obtained, respectively, from the solutions for A, B, and C.

Figure 4A:
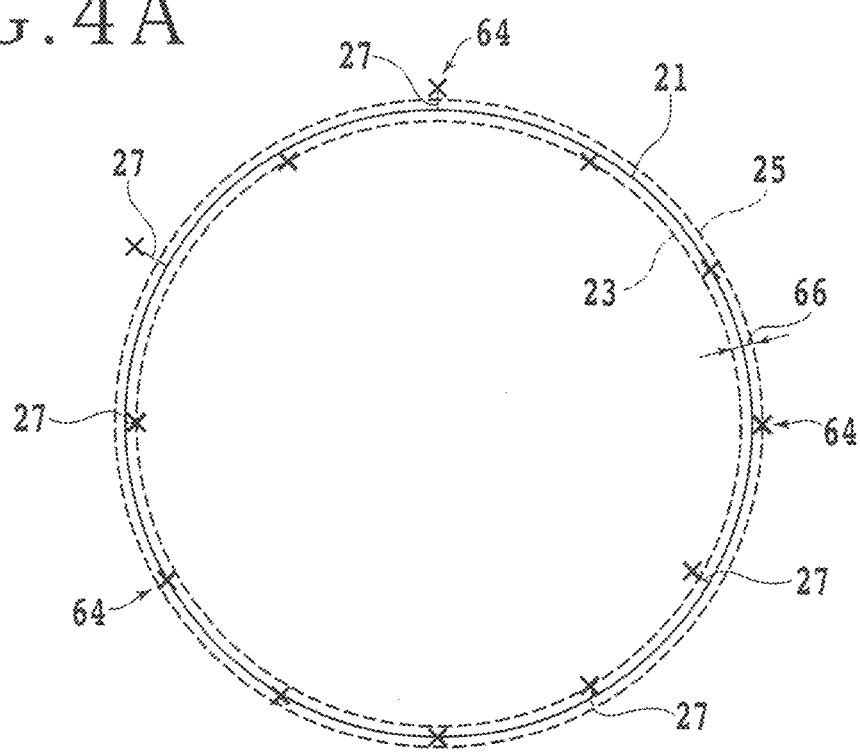
FIG. 4A is a diagram illustrating an approximate circle, an inner threshold circle and an outer threshold circle.
Figure 4B:
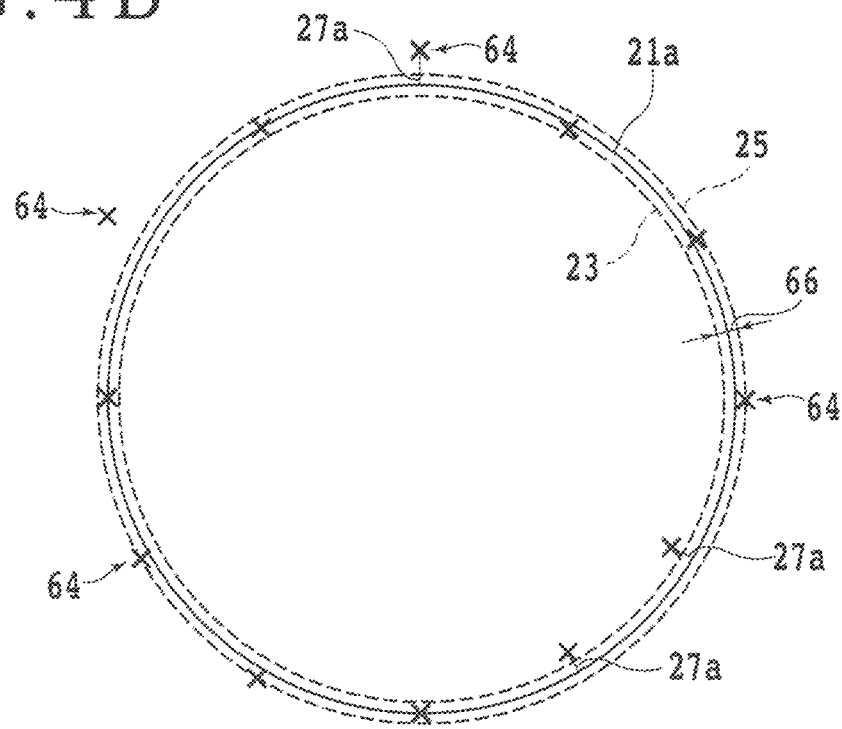
FIG. 4B is a diagram illustrating a second approximate circle, which has been formed by excluding from a plurality of points one having a greatest deviation, together with the inner threshold circle and the outer threshold circle.

The approximate circle forming section 62b further forms an inner threshold circle 23 having a diameter smaller by the preset threshold than the diameter of the approximate circle 21 and an outer threshold circle 25 having a diameter greater by the preset threshold than the diameter of the approximate circle 21 (see FIGS. 4A and 4B). The inner threshold circle 23 and the outer threshold circle 25 are circles arranged concentric to the approximate circle 21. In the embodiment, the threshold is set at 50 μm, although the threshold is not limited to 50 μm and may be set at 40 μm, 30 μm, or the like.

The control unit 62 further includes a determination section 62c configured from a program. The determination section 62c calculates the deviations 27 (see FIG. 4A) between the formed approximate circle 21 and all the points 64. Each deviation 27 is defined by a distance from the approximate circle 21 to the corresponding point 64 in the radial direction of the approximate circle 21. The determination section 62c next determines the point 64, the deviation of which is greatest, to be a false detection position if plural ones of the points 64 have deviations 27 greater than or equal to the preset threshold, respectively.

In addition, the determination section 62c excludes the point 64, which has been determined to be the false detection position, from consideration candidates when the approximate circle forming section 62b next forms an approximate circle 21. For example, the determination section 62c excludes the false detection position from the consideration candidates by communicating the point 64, which is to be excluded, to the approximate circle forming section 62b. As an alternative, the determination section 62c may communicate to the approximate circle forming section 62b all the points 64 still remaining without exclusion. Upon reception of the communication from the determination section 62c, the approximate circle forming section 62b again forms an approximate circle 21 based on the coordinates of three or more of the points 64 still remaining without exclusion (see FIG. 4B).

The control unit 62 further includes a cutting area deriving section 62d configured to derive a cutting area. The cutting area deriving section 62d is configured from a program and estimates the latest approximate circle 21 to be the position of the edge 11c of the outer peripheral portion of the workpiece 11. From the latest approximate circle 21, the cutting area deriving section 62d then derives as a cutting area (machining area) an annular area that extends from the latest approximate circle 21 to a predetermined position on the side of the center of the latest approximate circle 21. The cutting area to which cutting is to be applied is derived in this manner. The cutting area substantially corresponds to an annular area 11e from the edge 11c to a predetermined position 11d on the front surface 11a (see FIG. 2B). It is to be noted that if no false detection position exists from the beginning among all the points 64, the cutting area deriving section 62d derives a cutting area under an assumption that the approximate circle 21 formed based on all the points at the beginning is the edge 11c of the workpiece 11.

Figure 5:
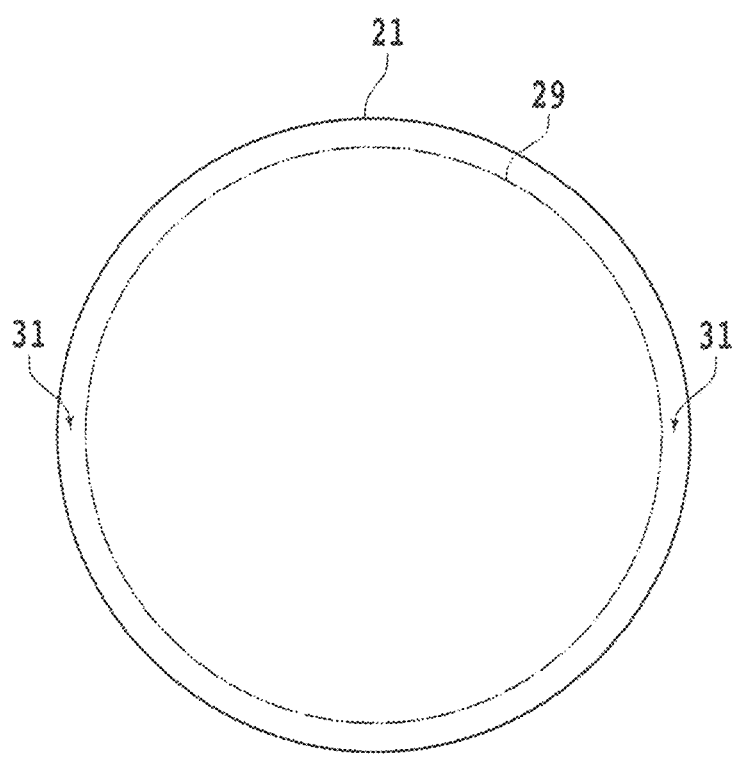
FIG. 5 is a diagram illustrating a cutting area.
Figure 6:
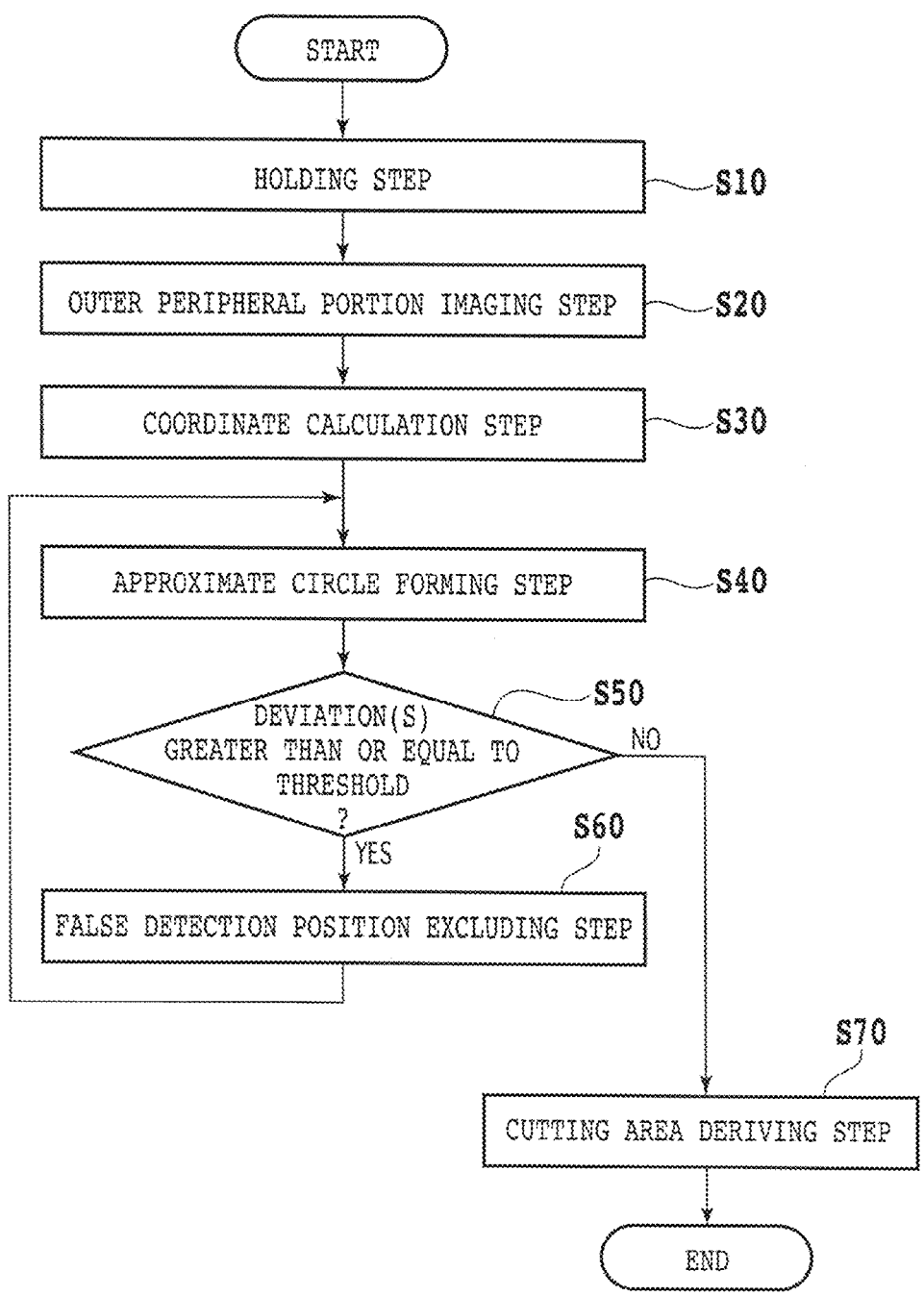
FIG. 6 is a flow diagram of an edge alignment method.

Referring FIG. 2A and FIGS. 2B through 6, a description will next be made about the edge alignment method for the workpiece 11. It is to be noted that FIG. 6 is a flow diagram of an edge alignment method according to the embodiment. The workpiece 11 is first held under suction on the side of a back surface 11b thereof on the holding surface 20b of the chuck table 20 (holding step S10). At this time, the center of the back surface 11b is arranged so as to substantially coincide with the center of the holding surface 20b.

Figure 2A:
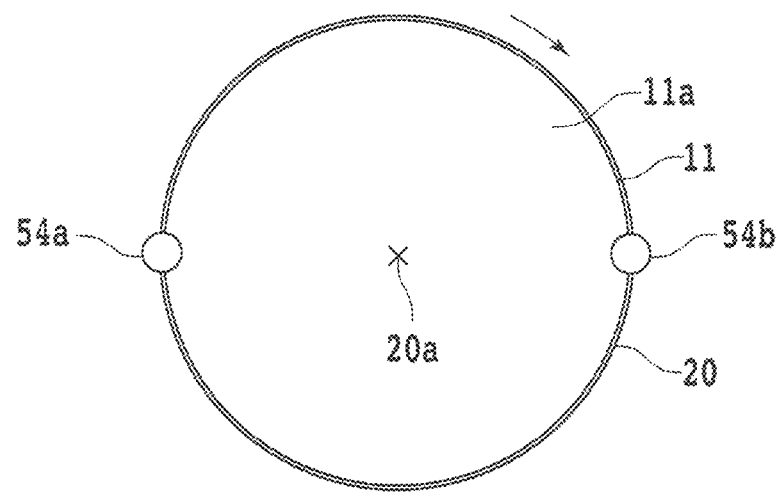
FIG. 2A is a top plan view of a workpiece, a chuck table, and cameras.

After the holding step S10, one position on the outer peripheral portion on the side of the front surface 11a held in a stationary state is imaged from above by using, for example, the camera unit 54a. FIG. 2A is a top plan view of the workpiece 11, the chuck table 20, and the camera units 54a and 54b, and illustrates an outer peripheral portion imaging step S20. After rotating the chuck table 20 by a predetermined angle about the rotating shaft 20a, the chuck table 20 is then brought into standstill, and a further one location on the outer peripheral portion on the side of the front surface 11a is imaged from above by the camera unit 54a again. By repeating the rotation over the predetermined angle and the imaging of the outer peripheral portion on the side of the front surface 11a a plurality times as described above, the workpiece 11 is imaged at a plurality of different locations in the peripheral direction thereof (outer peripheral portion imaging step S20).

In the embodiment, the workpiece 11 is imaged with the camera unit 54a at twelve different locations on the outer peripheral portion thereof by rotating the chuck table 20 at 30 degrees intervals. It is to be noted that the rotation angle is not limited to any specific constant angle but may be changed in a predetermined pattern like 40 degrees, 10 degrees, 25 degrees, 40 degrees, 10 degrees, 25 degrees, and so on, or may be changed at random. Further, the camera unit 54b may be used instead of the camera unit 54a, or both the camera unit 54a and the camera unit 54b may be used. The use of both the camera unit 54a and the camera unit 54b can shorten the time required for the outer peripheral portion imaging step S20 in comparison with the use of one of them.

Figure 2B:
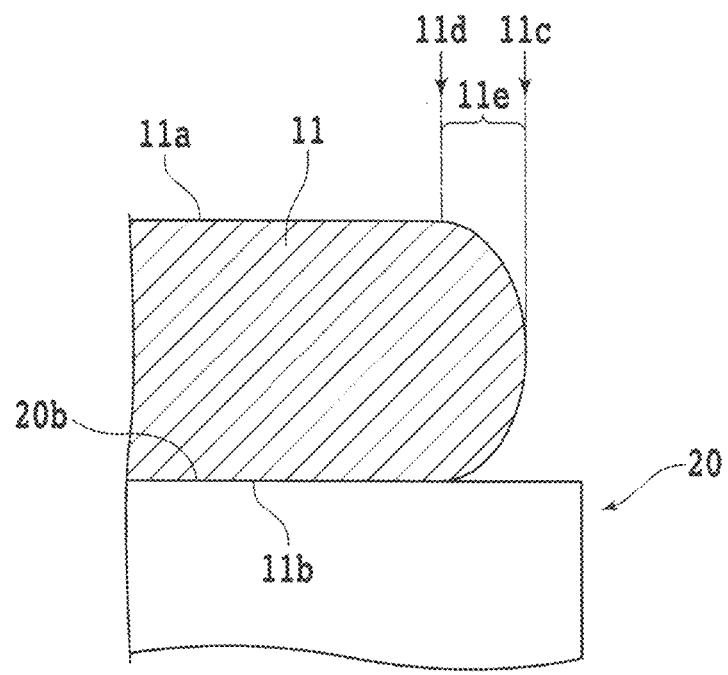
FIG. 2B is a partially cross-sectional, fragmentary side view of the work piece and the chuck table.

FIG. 2B is a partially cross-sectional, fragmentary side view of the work piece 11 and the chuck table 20 as seen at the outer peripheral portion of the workpiece 11. When the outer peripheral portion is imaged by the camera unit 54a and/or the camera units 54b, the brightness and darkness of the captured image are reversed due to differences in the reflectance of light with the edge 11c serving as a boundary. As presented in FIGS. 3A and 3B, for example, uniform brightness is observed at an area corresponding to a side outer than the edge 11c in the radial direction of the surface 11a. At a beveled portion, on the other hand, the image becomes darker as the pixels get closer to the center of the surface 11a. Further, the image has substantially uniform darkness on a center side of the surface 11a relative to an inner peripheral end portion of the beveled portion.

Figure 3A:
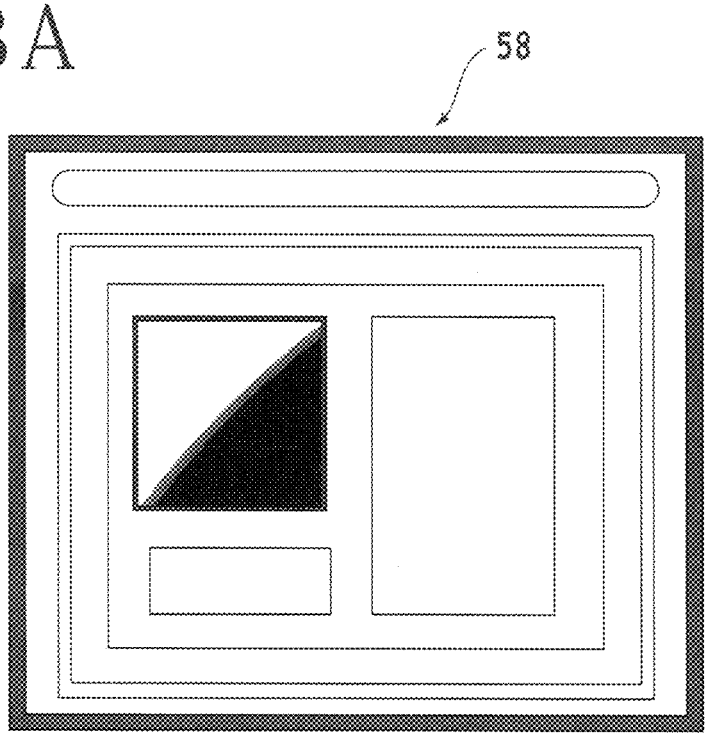
FIG. 3A is a diagram presenting an example of an image on a display screen.
Figure 3B:
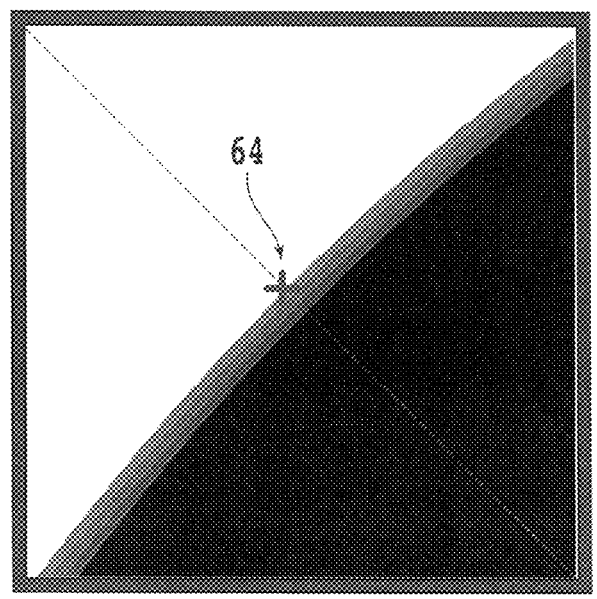
FIG. 3B is an enlarged view of an example of an image at a location on an outer peripheral portion of the workpiece.

FIG. 3A is an example of an image presented on the display 58. The presented image includes the image of the outer peripheral portion of the workpiece 11. FIG. 3B is an enlarged view of an example of an image at one location on the outer peripheral portion of the workpiece 11. It is to be noted that the brightness and darkness of the image are not limited to the above-described example and the image may be presented dark on a side outer than the edge 11c and bright on a side inner than the edge 11c. As described above, the coordinate calculation section 62a subjects the image to the binarization processing by using a predetermined pixel value as a threshold, and defines the point of intersection of a boundary, which has been formed by the binarization processing, and the predetermined diagonal (broken line in FIG. 3B) of the image to be the point 64. In FIG. 3B, the point 64 is indicated by sign "+."

Subsequently, the coordinate calculation section 62a calculates the coordinates of the points 64 of the workpiece 11 at the respective locations imaged in the outer peripheral portion imaging step S20 (coordinate calculation step S30). The points 64 are those which have a possibility corresponding to the edge 11c of the workpiece 11. Every time one image is acquired in the outer peripheral portion imaging step S20, the coordinate calculation section 62a in the embodiment calculates the coordinates of the point 64 in the image. However, the coordinate calculation section 62a may calculate the coordinates of the points 64 in the respective images all together after among the images to be acquired in the outer peripheral portion imaging step S20, plural ones or all of the images are acquired.

After the coordinates of all the points 64 are calculated, the approximate circle forming section 62b forms an approximate circle 21 by applying the least squares method to the coordinates of all the points 64 as calculated in the coordinate calculation step S30 (approximate circle forming step S40). In the approximate circle forming step S40 in the embodiment, the approximate circle 21 is considered to have been formed once the center coordinates (a, b) and the radius r of the approximate circle 21 are calculated. It is to be noted that, in the approximate circle forming step S40, the approximate circle 21 so formed may be actually presented on the display 58.

For convenience of explanation, a description will hereinafter be made of a case in which the approximate circle 21 is presented on the display 58 in the approximate circle forming step S40. FIG. 4A is a diagram illustrating the approximate circle 21 formed in the approximate circle forming step S40 together with the inner threshold circle 23 and the outer threshold circle 25. In FIG. 4A, the individual points 64 obtained in S10 to S30 are indicated by x, and the approximate circle 21 is indicated by a solid line. In addition, the inner threshold circle 23 and the outer threshold circle 25 arranged concentrically with the approximate circle 21 are indicated by broken lines. For various factors, some of the points 64 may fall out of a range (permissible range 66) between the inner threshold circle 23 and the outer threshold circle 25. For example, due to a contaminant particle adhered on the beveled portion, a water droplet or contaminant particle adhered on the holding surface 20b, a contaminant particle adhered on a lens of the camera unit 54a, an inadequate light quantity upon imaging, abnormality in the shape of the edge 11c, or the like, some of the points 64 may fall out of the permissible range 66.

In the embodiment, the points 64 located outside the permissible range 66 are regarded as false detection positions, and the false detection positions are excluded from consideration candidates for the approximate circle forming step S40 to be performed next. Accordingly, the determination section 62c first calculates the deviations 27 between the approximate circle 21 and the respective ones of all the points 64. The determination section 62c then determines whether there is or are any point or points 64 the deviation or deviations 27 of which is or are located outside the permissible range 66 (in other words, the deviations 27 are greater than or equal to the preset threshold) (deviation comparison step S50). If YES in S50, the determination section 62c excludes the point or points 64, which have been determined to be the false detection position or positions, from the consideration candidates to be used when the approximate circle forming section 62b next forms an approximate circle 21 (false detection position excluding step S60). As a consequence, the position of the edge 11c of the workpiece 11 can be estimated with higher accuracy compared with a case in which the false detection position or positions are not excluded.

It is to be noted that if all the points 64 are located within the permissible range 66 (NO in S50), the cutting area deriving section 62d estimates the approximate circle 21 to be the position of the edge 11c of the workpiece 11. Based on the estimated position of the edge 11c, the cutting area deriving section 62d then derives the cutting area 31 (cutting area deriving step (machining area deriving step) S70). Described specifically, the cutting area deriving section 62d derives, as a cutting area 31, the annular area from the approximate circle 21 (in other words, the estimated position of the edge 11c) to a predetermined position 29 on the center side of the approximate circle 21. FIG. 5 is a diagram illustrating the cutting area 31. After S70, the cutting area 31 is cut and removed to a predetermined depth by using the cutting unit 50a or 50b.

If YES in S50 as described above, on the other hand, the processing returns to S40 again after the false detection position excluding step S60. Using the least squares method on the coordinates of all the points 64 still remaining without exclusion from the consideration candidates, the approximate circle forming section 62b then forms an approximate circle again (second (additional) approximate circle forming step S40). FIG. 4B is a diagram illustrating a second approximate circle 21a, which has been formed by excluding from the plural points 64 one (the point 64 located at the position of 10 o'clock in FIG. 4B) having a greatest deviation 27, together with the inner threshold circle 23 and the outer threshold circle 25. It is to be noted that the second approximate circle 21a has a center and a radius, which are usually different from the center and radius of the preceding approximate circle 21.

After the second approximate circle forming step S40, the determination section 62c calculates, in S50, deviations 27a between the second approximate circle 21a and all the points 64 still remaining without exclusion. If plural ones of the points 64 have deviations 27a greater than or equal to the preset threshold, respectively (in other words, YES in S50), the determination section 62c determines the point 64, the deviation 27a of which is greatest, to be the false detection position. The determination section 62c then excludes the point 64, which has been determined to be the false detection position, from consideration candidates (second (additional) false detection position excluding step S60). These false detection position excluding step S60 and approximate circle forming step S40 are repeated until no false detection position exists (in other words, until determined to be NO in S50).

If no point 64 is determined to have a deviation 27a greater than or equal to the preset threshold (in other words, NO in S50), the cutting area deriving section 62d estimates the position of the edge 11c from the coordinates of three or more of the points 64 still remaining without exclusion, and derives the cutting area 31 (cutting area deriving step S70). In the embodiment, the points 64 the deviations 27 and 27a or the like of which are relatively large are excluded as false detection positions from consideration candidates for the approximate circle 21, whereby the edge 11c of the workpiece 11 can be estimated with higher accuracy. Consequently, the cutting area 31 can be derived with high accuracy.

In addition, the configurations, procedures, and the like according to the embodiment can be practiced with appropriate changes, alterations or modifications without departing from the scope of the object of the present invention. Instead of the camera units 54a and 54b, for example, laser displacement meters (unillustrated) may be used. The laser displacement meters each include a light source (unillustrated) such as a laser diode. A laser beam emitted from the light source is shaped by a transmitter lens (unillustrated) so as to spread in a predetermined direction that intersects the advancing direction of the laser beam at right angles, and is irradiated in a line shape to the side of the front surface 11a so as to cross the edge 11c. The light reflected on the object is guided to a linear sensor (unillustrated) via a receiver lens (unillustrated). The linear sensor (unillustrated) has a plurality of photoelectric conversion devices arrayed linearly at predetermined intervals of 10 μm or so.

A description will next be made about procedures that perform an edge alignment by using one of the above-described laser displacement meters. In the holding step S10, the workpiece 11 is first held on the side of the back surface 11b thereof. After S10, in place of the outer peripheral portion imaging step S20, a position detection step S25 (unillustrated) is performed using the laser displacement meter. In S25, a laser beam is irradiated in a line shape to the side of the front surface 11a of the workpiece 11 held in a stationary state so that the laser beam crosses the edge 11c. The position of a point 64, which has a possibility of corresponding to the edge 11c, is detected by receiving the reflected light at the linear sensor. Subsequently, the chuck table 20 is rotated as in the above-described S20, whereby the positions of points 64, which have a possibility of corresponding to the edge 11c, are detected at respective ones of plural different locations in the peripheral direction of the workpiece 11 on the outer peripheral position of the workpiece 11. After the position detection step S25, the coordinate calculation section 62a calculates the coordinates of the point 64 at each location by using the rotating shaft 20a as an origin (coordinate calculation step S30). Processing after S30 is the same as in the above-described edge alignment method.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. An edge alignment method for a disc-shaped workpiece, comprising:
    a holding step of holding the workpiece on a chuck table,
    an imaging step of imaging at least a portion of the workpiece at a plurality of different locations in a peripheral direction of the workpiece on an outer peripheral portion of the workpiece,
    a coordinate calculation step of calculating coordinates of a plurality of points having a possibility of corresponding to an edge of the workpiece at the plurality of different locations imaged during the imaging step, wherein the coordinates are calculated based on images obtained during the imaging step,
    an approximate circle forming step of forming an approximate circle by using a least squares method on all the coordinates calculated in the coordinate calculation step,
    a false detection position excluding step of calculating deviations between the approximate circle formed in the approximate circle forming step and respective ones of all the points, and in a case where plural ones of the points have deviations greater than or equal to a preset threshold, respectively, determining the point, the deviation of which is greatest, to be a false detection position, and excluding from consideration candidates the point determined to be the false detection position,
    a machining area deriving step of, after the false detection position excluding step, estimating a position of the edge of the workpiece from the coordinates of three or more of the points still remaining without exclusion, and based on the estimated position of the edge, deriving a machining area at the outer peripheral portion of the workpiece,
    wherein the method further comprises:
        an additional approximate circle forming step of, after the exclusion of the point the deviation of which is the greatest in the false detection position excluding step, for ming an approximate circle again by using the least squares method on the coordinates of all the points still remaining without exclusion from the consideration candidates in the false position excluding step, and
        an additional false detection position excluding step of calculating deviations between the approximate circle formed in the additional approximate circle forming step and the respective ones of all the points still remaining without exclusion from the consideration candidates in the false detection position excluding step, and if plural ones of the points have deviations greater than or equal to the preset threshold, respectively, determining the point, the deviation of which is greatest, to be a false detection position, and excluding from consideration candidates the point determined to be the false detection position,
    wherein in a case where no point is determined to have a deviation greater than or equal to the preset threshold after calculating the deviations between the approximate circle formed in the additional approximate circle forming step and the respective ones of all the points remaining without exclusion from the consideration candidates in the false detection position excluding step, the machining area deriving step is performed again.

2. The edge alignment method according to claim 1, further comprising:
    performing the additional approximate circle forming step and the additional false detection position excluding step when it has been determined that there exists a deviation in one of the points that is greater than or equal to the preset threshold.

3. An edge alignment method for a disc-shaped workpiece, comprising:
    a holding step of holding the workpiece on a chuck table,
    a coordinate calculation step of calculating coordinates of a plurality of points having a possibility of corresponding to an edge of the workpiece at a plurality of different locations in a peripheral direction of the workpiece on an outer peripheral portion of the workpiece,
    an approximate circle forming step of forming an approximate circle by using a least squares method on all the coordinates calculated in the coordinate calculation step,
    a false detection position excluding step of calculating deviations between the approximate circle formed in the approximate circle forming step and respective ones of all the points, and in a case where plural ones of the points have deviations greater than or equal to a preset threshold, respectively, determining the point, the deviation of which is greatest, to be a false detection position, and excluding from consideration candidates the point determined to be the false detection position,
    an additional approximate circle forming step of, after the exclusion of the point the deviation of which is the greatest in the false detection position excluding step, forming an approximate circle again by using the least squares method on the coordinates of all the points still remaining without exclusion from the consideration candidates in the false position excluding step,
    an additional false detection position excluding step of calculating deviations between the approximate circle formed in the additional approximate circle forming step and the respective ones of all the points still remaining without exclusion from the consideration candidates in the false detection position excluding step, and if plural ones of the points have deviations greater than or equal to the preset threshold, respectively, determining the point, the deviation of which is greatest, to be a false detection position, and excluding from consideration candidates the point determined to be the false detection position, and a machining area deriving step of, after the additional false detection position excluding step, estimating a position of the edge of the workpiece from the coordinates of three or more of the points still remaining without exclusion, and based on the estimated position of the edge, deriving a machining area at the outer peripheral portion of the workpiece, and wherein in a case where no point is determined to have a deviation greater than or equal to the preset threshold after calculating the deviations between the approximate circle formed in the additional approximate circle forming step and the respective ones of all the points remaining without exclusion from the consideration candidates in the false detection position excluding step, the machining area deriving step is performed again.

* * * * *